(12) United States Patent
Kim

(10) Patent No.: US 11,396,282 B2
(45) Date of Patent: Jul. 26, 2022

(54) AUTONOMOUS EMERGENCY BRAKING SYSTEM AND METHOD OF CONTROLLING SAME

(71) Applicant: MANDO CORPORATION, Pyeongtaek-si (KR)

(72) Inventor: In Soo Kim, Seongnam-si (KR)

(73) Assignee: Mando Mobility Solutions Corporation, Pyeongtaek-si (KR)

( * ) Notice: Subject to any disclaimer, the term of this patent is extended or adjusted under 35 U.S.C. 154(b) by 167 days.

(21) Appl. No.: 16/864,573

(22) Filed: May 1, 2020

(65) Prior Publication Data

US 2020/0254984 A1 Aug. 13, 2020

Related U.S. Application Data

(63) Continuation of application No. 16/177,910, filed on Nov. 1, 2018, now Pat. No. 10,688,974.

(30) Foreign Application Priority Data

Nov. 2, 2017 (KR) .......................... 10-2017-0145564

(51) Int. Cl.
*B60T 7/22* (2006.01)
*G01S 13/931* (2020.01)
(Continued)

(52) U.S. Cl.
CPC ............... *B60T 7/22* (2013.01); *G01S 7/412* (2013.01); *G01S 7/414* (2013.01); *G01S 13/42* (2013.01);
(Continued)

(58) Field of Classification Search
None
See application file for complete search history.

(56) References Cited

U.S. PATENT DOCUMENTS 6,404,328 B1 * 6/2002 Alland .................... G01S 7/411
340/435
6,765,523 B2 7/2004 Ono
(Continued)

FOREIGN PATENT DOCUMENTS

JP 2001-191876 A 7/2001
JP 2003-185744 A 7/2003
(Continued)

OTHER PUBLICATIONS

Notice of Allowance issued in corresponding Korean Application No. 10-2017-0145564, dated Jul. 17, 2019 (with English translation).
(Continued)

*Primary Examiner* — Abdhesh K Jha
(74) *Attorney, Agent, or Firm* — Morgan, Lewis & Bockius LLP

(57) ABSTRACT

Disclosed are an autonomous emergency braking system and a method of controlling the same, wherein at least one track corresponding to the target is formed using the received radar signal, it is determined whether the tracks are generated by another vehicle, and it is determined whether the tracks determined to be generated by the other vehicle are generated by an overhead structure. Accordingly, it is possible to prevent the overhead structure from being mistaken for a vehicle and thus to prevent a malfunction of the system and improve reliability.

14 Claims, 12 Drawing Sheets

(51) Int. Cl.
    *G01S 13/42*          (2006.01)
    *G01S 13/72*          (2006.01)
    *G01S 7/41*            (2006.01)
    *G01S 7/02*            (2006.01)

(52) U.S. Cl.
    CPC .......... *G01S 13/726* (2013.01); *G01S 13/931* (2013.01); *B60T 2210/32* (2013.01); *G01S 7/023* (2013.01); *G01S 2013/932* (2020.01); *G01S 2013/93185* (2020.01); *G01S 2013/93271* (2020.01); *G01S 2013/93272* (2020.01); *G01S 2013/93275* (2020.01)

(56) References Cited

U.S. PATENT DOCUMENTS 9,097,801 B2 *   8/2015   Kambe  ................. G01S 13/867
    9,606,225 B2 *   3/2017   Okita  .................... G01S 13/04

FOREIGN PATENT DOCUMENTS

| KR | 10-0662063 B1 | 12/2006 | |
|---|---|---|---|
| KR | 10-2014-0052496 A | 5/2014 | |
| WO | WO-2007098999 A1 * | 9/2007 | ......... B60K 31/0008 |

OTHER PUBLICATIONS

Korean Office Action dated Jan. 7, 2019 issued in Korean Patent Application No. 10-2017-0145564.

Notice of Allowance issued in U.S. Appl. No. 16/177,910 dated Feb. 3, 2020.

* cited by examiner

200

AUTONOMOUS EMERGENCY BRAKING SYSTEM AND METHOD OF CONTROLLING SAME

CROSS REFERENCE TO RELATED APPLICATION

This application is a continuation of U.S. patent application Ser. No. 16/177,910, filed Nov. 1, 2018 which claims priority from Korean Patent Application No. 10-2017-0145564, filed on Nov. 2, 2017, which is hereby incorporated by reference for all purposes as if fully set forth herein.

BACKGROUND OF THE INVENTION

1. Field of the Invention

The present disclosure relates to an autonomous emergency braking system and a method of controlling the same, and more particularly to an emergency braking system and a method of controlling the same which can prevent a system malfunction and improve reliability by preventing an overhead structure on a road from being mistaken for a vehicle.

2. Description of the Prior Art

When detecting an object in front of a traveling vehicle, an autonomous emergency braking system may measure a separation distance and a relative speed with the object to determine a risk of collision with the object, and when there is the possibility of a collision, provide a warning to a driver, and autonomously brake the vehicle regardless of braking by the driver.

The autonomous emergency braking system may prevent a collision with a preceding vehicle or a pedestrian due to a mistake, carelessness, or slow reaction of the driver, and even when the collision cannot be avoided, decrease an impact speed as much as possible, so as to reduce damage.

In general, the autonomous emergency braking system may detect an object ahead through a radar sensor and measure the separation distance and the relative speed with the object on the basis of a radar signal reflected from the object.

When the object is detected using the radar signal, an overhead structure such as a pedestrian overpass, a bridge, a parking lot, or a tunnel may be mistaken for a preceding vehicle and thus emergency braking may be performed unnecessarily in some cases. Accordingly, it is required to prevent such an overhead structure from being mistaken for a preceding vehicle in order to prevent unnecessary emergency braking.

SUMMARY OF THE INVENTION

An aspect of the present disclosure is to provide an autonomous emergency braking system and a method of controlling the same which are capable of preventing a malfunction of the system and improving reliability by preventing an overhead structure from being mistaken for a vehicle.

In accordance with an aspect of the present disclosure, an autonomous emergency braking system is provided. The autonomous emergency braking system includes: a driving information collection module configured to acquire driving information of a vehicle and process the acquired driving information; a radar module configured to radiate a radar signal to an outside of the vehicle, receive the radar signal reflected from a target, and process the received radar signal; and a controller configured to determine whether to perform emergency braking on the vehicle, based at least partially on processing of the driving information and the radar signal, wherein the controller forms at least one track corresponding to the target through the processed radar signal, determines whether the tracks are generated by another vehicle, and determines whether the tracks determined to be generated by the other vehicle are generated by an overhead structure.

In accordance with another aspect of the present disclosure, an autonomous emergency braking system is provided. The autonomous emergency braking system includes: a driving information collection module configured to acquire driving information of a vehicle; a radar module configured to radiate a radar signal to an outside of the vehicle and receive the radar signal reflected from a target; and a domain control unit configured to process the driving information and the radar signal, determine whether to perform emergency braking of the vehicle, and control at least one driver assistance system module included in the vehicle, wherein the domain control unit forms at least one track corresponding to the target through the processed radar signal, determines whether the track is generated by another vehicle, and determines whether the tracks determined to be generated by the other vehicle are generated by an overhead structure.

In accordance with another aspect of the present disclosure, a method of controlling an autonomous emergency braking system is provided. The method includes: a radar signal transmission step of radiating a radar signal; a radar signal reception step of receiving the radar signal reflected from a target; a target detection step of forming at least one track corresponding to the target through the radar signal received in the radar signal reception step; a first classification step of determining whether the tracks are generated by another vehicle; and a second classification step of determining whether the tracks determined to be generated by the other vehicle in the first classification step are generated by an overhead structure.

According to the present disclosure, when a track is primarily determined to be a vehicle, it may be secondarily determined whether an overhead structure is mistaken for the vehicle on the basis of an RCS difference. Accordingly, it is possible to prevent a malfunction of the autonomous emergency braking system and thus improve the reliability of the system by preventing emergency braking due to overhead structures.

BRIEF DESCRIPTION OF THE DRAWINGS

The above and other aspects, features and advantages of the present disclosure will be more apparent from the following detailed description taken in conjunction with the accompanying drawings, in which.

DETAILED DESCRIPTION OF THE EXEMPLARY EMBODIMENTS

Figure 1A:
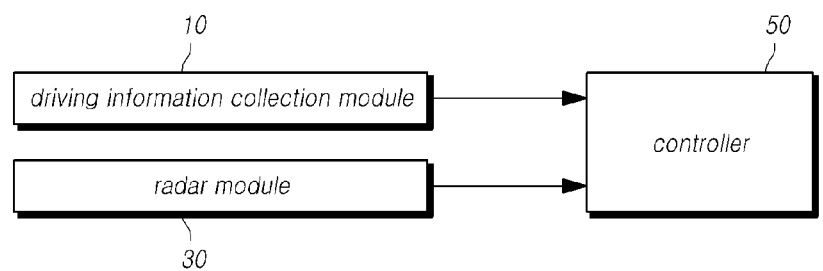
FIG. 1A is a block diagram illustrating an autonomous emergency braking system according to the present disclosure.

Hereinafter, embodiments of the present disclosure will be described in detail with reference to the accompanying drawings. In the following description, the same components will be designated by the same reference numerals although they are shown in different drawings. Further, in the following description of the present disclosure, a detailed description of known functions and configurations incorporated herein will be omitted when it is determined that the description may make the subject matter of the present disclosure rather unclear.

In addition, terms, such as first, second, A, B, (a), (b) or the like may be used herein when describing components of the present disclosure. These terms are merely used to distinguish one structural element from other structural elements, and a property, an order, a sequence and the like of a corresponding structural element are not limited by the term. It should be noted that if it is described in the specification that one component is "connected," "coupled" or "joined" to another component, a third component may be "connected," "coupled," and "joined" between the first and second components, although the first component may be directly connected, coupled or joined to the second component.

FIG. 1A is block diagrams illustrating an autonomous emergency braking system according to the present disclosure.

The autonomous emergency braking system according to the present disclosure can prevent an overhead structure from being recognized as a vehicle when a target is detected using a radar, thereby preventing emergency braking due to the overhead structure. The autonomous emergency braking system may include a driving information collection module 10 configured to acquire driving information of a vehicle and process the acquired driving information, a radar module 30 configured to radiate a radar signal to the outside of the vehicle, receive a radar signal reflected from a target, and process the received radar signal, and a controller 50 configured to determine whether to perform emergency braking on the vehicle at least partially on the basis of processing of the driving information and the radar signal.

Figure 2:
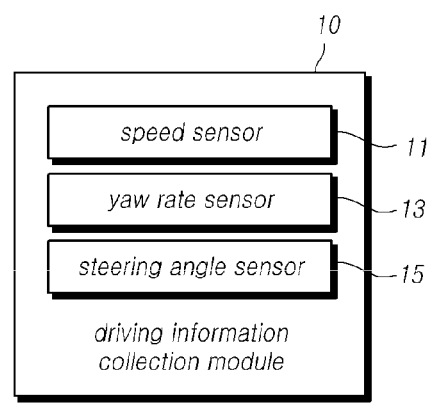
FIG. 2 is a block diagram illustrating a driving information collection module of FIG. 1.

The driving information collection module 10 may collect vehicle driving information which may influence emergency braking when the vehicle travels and may include a speed sensor 11, a yaw rate sensor 13, and a steering angle sensor 15, as illustrated in FIG. 2. The speed sensor 11 may detect a rotation speed of wheels, the yaw rate sensor 13 may detect a tilt according to rotation of the vehicle, and the steering angle sensor 15 may detect a rotation angle of the steering wheel. Information detected by the speed sensor 11, the yaw rate sensor 13, and the steering angle sensor 15 may be provided to a controller 50. The driving information collection module 10 may include various sensors for collecting driving information of the vehicle other than the above-described sensors.

The radar module 30 may apply a chirp radar, a pulse radar for receiving a target echo signal mixed with an interference signal in an impulse noise form, and a Frequency-Modulated Continuous Wave (FMCW) radar. An FMCW scheme is a useful modulation scheme in the case in which a target a short distance away is sensed because the reception intensity varies depending on the distance. Accordingly, when a frequency is sensed, a distance can be calculated, and thus a reception performance is excellent.

Figure 3:
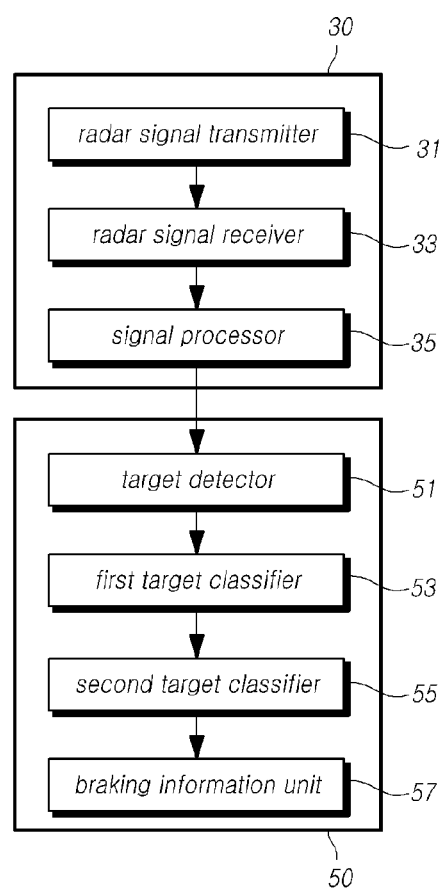
FIG. 3 is a block diagram illustrating a radar module and a controller of FIG. 1.

As illustrated in FIG. 3, the radar module 30 may include a radar signal transmitter 31 configured to output a radar signal to the outside, a radar signal receiver 33 configured to receive a radar signal reflected from a target, and a signal processor 35 configured to remove an interference signal from the received radar signal and reconstruct the radar signal into an original signal.

The radar signal transmitter 31 may transmit a radar signal to a target, and the transmitted radar signal may have different modulation forms depending on the radar type.

The radar signal receiver 33 may receive a radar signal transmitted by the radar signal transmitter 31 and reflected from the target.

In the case of the pulse radar, when the radar signal transmitter 31 radiates short and strong microwaves for a microsecond (one millionth of a second), the radar signal hits and is reflected from the target and part of the reflected microwave energy is captured by the radar signal receiver 33. At this time, the distance from the target is measured by calculating the round trip time of the microwaves reflected and returned from the target.

In the FMCW radar, the radar signal transmitter 31 radiates microwaves modulated to the frequency of a linear sawtooth wave or a triangular wave at the same amplitude, and the rise time and fall time of the modulated frequency are set as long as a reflected wave returns to the radar signal receiver 33 before the modulation process ends. When time elapses after the radiation of the microwaves, the returned reflected wave is mixed with the radiated wave of which the frequency is changed, and the FMCW radar measures a distance from the target by removing an Intermediate Frequency (IF) from the mixed signal. The distance from the target is proportional to the frequency lapse time of the mixed signal under the assumption that the target does not move.

There is a difference in the oscillation type and the sensing method between the chirp radar and the pulse radar, and the chirp radar uses a modulated frequency having a longer transfer time for the oscillation pulse wave than the pulse radar. Due to the characteristics of the reflected wave received by the radar signal receiver 33, a low-frequency signal arrives later than a high-frequency signal.

The signal processor 35 may sense an interference signal in the radar signal received by the radar signal receiver 33 and reconstruct the radar signal on the basis of the sensed interference signal. The signal processor 35 may perform a process of pre-processing the received radar signal in order to more accurately detect the interference signal from the radar signal and use one of a signal differential method, a signal normalization method, a filtering method, a feature extraction method, and a noise reduction method in the pre-processing process.

The signal processor 35 may detect the interference signal from the radar signal having passed through the pre-processing process and reconstruct the radar signal on the basis of the detected interference signal. In order to reconstruct the radar signal, a mean filter and a filter using a Whittaker-Shannon interpolation formula may be used.

According to an embodiment, the radar module may include at least one radar sensor unit, for example, one or more of a front detection radar sensor mounted to the front of the vehicle, a rear radar sensor mounted to the rear of the vehicle, and a side or a rear side detection radar sensor mounted to each side of the vehicle. The radar sensor or the radar system may process data by analyzing a transmitted signal and a received signal and detect information on an object on the basis of the processed data, and may include an electronic control unit (ECU) or a processor therefor. Data transmission or signal communication from the radar sensor to the ECU may be performed through a communication link such as an appropriate vehicle network bus.

The radar sensor includes one or more transmission antennas for transmitting radar signals and one or more reception antennas for receiving reflected signals received from objects.

Meanwhile, the radar sensor according to the present embodiment may adopt a multi-dimensional antenna array and a signal Multiple-Input Multiple-Output (MIMO) transmission/reception scheme in order to form a virtual antenna aperture larger than an actual antenna aperture.

For example, a two-dimensional antenna array is used to achieve horizontal and vertical angular accuracy and resolution. Through the two-dimensional radar antenna array, signals are transmitted/received by two individual horizontal and vertical scans (temporally multiplied), and MIMO may be used separately from the two-dimensional radar horizontal and vertical scans (temporally multiplied).

More specifically, the radar sensor according to the present embodiment may adopt the two-dimensional array consisting of a transmission antenna unit including a total of 12 transmission antennas (Tx) and a reception antenna unit including 16 reception antennas (Rx), and as a result may have a total of 192 virtual reception antenna arrangements.

The transmission antenna unit includes 3 transmission antenna groups including 4 transmission antennas, wherein a first transmission antenna group may be vertically spaced apart from a second transmission antenna group by a predetermined distance and the first or second transmission antenna group may be horizontally spaced apart from a third transmission antenna group by a predetermined distance (D).

Further, the reception antenna unit may include 4 reception antenna groups, each of which includes 4 reception antennas, wherein the reception antenna groups may be vertically spaced apart from each other, and the reception antenna unit may be disposed between the first transmission antenna group and the third transmission antenna group, which are horizontally spaced apart from each other.

According to another embodiment, antennas of the radar sensor are disposed in a two-dimensional antenna array. For example, each antenna patch is arranged in the shape of a rhombus, and thus the number of unnecessary side lobes may be reduced.

Alternatively, the two-dimensional antenna array may include a V-shaped antenna array, in which a plurality of radial patches is disposed in a V shape, and, more particularly, may include two V-shaped antenna arrays. At this time, a signal feed may be performed at the apex of each V-shaped antenna array.

Alternatively, the two-dimensional antenna array may include an X-shaped antenna array, in which a plurality of radial patches is disposed in an X shape, and, more particularly, may include two X-shaped antenna arrays. At this time, signal feed may be performed at the center of each X-shaped antenna array.

Further, the radar sensor according to the present embodiment may use a MIMO antenna system in order to implement accurate detection and resolution vertically and horizontally.

More specifically, in the MIMO system, respective transmission antennas may transmit signals having independent waveforms distinguished from each other. That is, each transmission antenna may transmit a signal having an independent waveform distinguished from those of other transmission antennas, and each reception antenna may identify which transmission antenna transmits a reflected signal that is reflected from an object due to the different waveforms of the signal.

Further, the radar sensor according to the present embodiment may include a radar housing for accommodating a circuit and a substrate including transmission/reception antennas and a radome for configuring the exterior of the radar housing. At this time, the radome is formed with a material which can reduce attenuation of a transmitted/received radar signal, and may constitute a front/rear bumper of the vehicle, a grille, a side frame, or the exterior surface of components of the vehicle.

That is, the radome of the radar sensor may be disposed inside a vehicle grille, a bumper, or a frame. When the radar sensor is disposed as a part of the components constituting the exterior surface of the vehicle, such as the vehicle grille, the bumper, and part of the frame, it is possible to increase the aesthetic appearance of the vehicle and provide convenience in mounting the radar sensor.

Referring back to FIG. 3, the controller 50 may form at least one track corresponding to the target on the basis of the processed radar signal, determine whether the track is generated by another vehicle, and determine whether the track determined to be generated by the other vehicle is generated by an overhead structure.

To this end, the controller 50 may include a target detector 51 configured to generate a track on the basis of the reconstructed radar signal, a first target classifier configured to classify tracks generated by vehicles, a second target classifier 55 configured to classify tracks generated by overhead structures among the tracks classified to be generated by vehicles, and a braking information unit 57 configured to output information for determining emergency braking when it is determined that the track is generated by the vehicle.

The target detector 51 may form at least one track generated by the target on the basis of the radar signal reconstructed by the signal processor 35. When the radar signal reflected from the target is detected, the target detector 51 may form a track at a location corresponding to the corresponding radar signal. At this time, the target detector 51 may form a track only for a radar signal having a magnitude equal to or larger than a preset predetermined magnitude.

Figure 4:
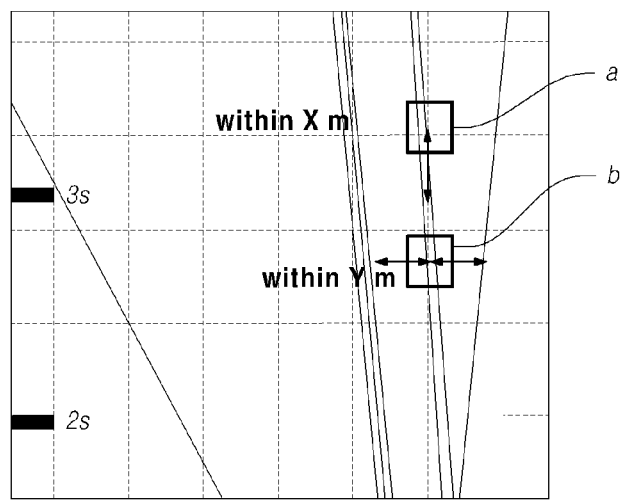
FIG. 4 illustrates tracks generated by a target detector.

When a plurality of tracks is generated as illustrated in FIG. 4, the target detector 51 may identify a predetermined range preset for each track and whether there is a track longitudinally within Y m and transversely within X m.

Here, a track formed by the radar signal having a relatively high intensity is referred to as a reference track (a) and a track neighboring the reference track (a) is referred to as a neighbor track (b). For example, the target detector 51 may identify whether there is a neighbor track (b) longitudinally within 5 m and transversely within 1 m from the reference track (a), and the predetermined range used for detecting the existence of the neighbor track (b) can be freely changed by a designer. When there is a neighbor track (b) within the preset predetermined range, the target detector 51 may provide information on the reference track (a) and the neighbor track (B) to the first target classifier 53.

The first target classifier 53 may determine whether the reference track (a) and the neighbor track (b) formed by the target detector 51 are formed by the vehicle or clutter, that is, objects other than the vehicle. The first target classifier 53 may classify the vehicle and the clutter through various existing methods.

For example, the first target classifier 53 may use a feature extraction method. In the feature extraction method, it is possible to determine whether each track is formed by the vehicle by pre-calculating feature values for feature points of the vehicle and comparing the pre-calculated feature values with feature values of each track.

In another example, the first target classifier 53 may use a classification method. In the classification method, data on vehicles is displayed as coordinates, a cluster is formed through grouping of the vehicles, and a feature reference for determining the characteristics of the vehicles is prepared. Next, the first target classifier 53 may determine whether each track is formed by the vehicle by determining whether the track matches the feature reference. The first target classifier 53 may determine whether each track is a vehicle through various known methods as well as the above examples. The first target classifier 53 may set a flag value of the track determined to be the vehicle as 1 and provide information on the corresponding track to the second target classifier 55.

Meanwhile, although it has been described that the first target classifier 53 classifies the tracks only into the vehicle and the clutter, the tracks may be classified into three types, such as the vehicle, the clutter, and an undecided type. In this case, a flag value of the clutter may be set as 0, an undecided flag value may be set as 1, and a flag value of the vehicle may be set as 2. An object which is difficult to be accurately determined as the clutter or the vehicle may be set as an undecided object.

In the following embodiment, the case in which the tracks are classified only into the vehicle and the clutter and the track is the clutter when the flag value is 0 and the track is the vehicle when the flag value is 1 will be described by way of an example.

The second target classifier 55 may receive information on the track determined to be the vehicle from the first target classifier 53 and determine whether the corresponding track is formed by a vehicle or an overhead structure. The second target classifier 55 may distinguish between the vehicle and the overhead structure through a Radar Cross Section (RCS), which is a reflection area of the radar signal, and the size of the RCS may be calculated as the size of the received radar signal. The second target classifier 55 may calculate the size of the RCS for each track and calculate an RCS difference between the reference track (a) and the neighbor track (b) as shown in Equation (1) below.

$$R_n(t) = (\sigma_n(t) - \sigma_k(t))$$ [Equation 1]

In Equation (1), $\sigma_n(t)$ denotes an RCS of an $n^{th}$ reference track (a) and $\sigma_k(t)$ denotes an RCS of the neighbor track (b).

When the difference between the reference track (a) and the neighbor track (b) is larger than or equal to a preset predetermined difference value, the second target classifier 55 may determine that the reference track (a) and the neighbor track (b) are generated by vehicles. On the other hand, when the difference between the reference track (a) and the neighbor track (b) is equal to or smaller than a preset predetermined difference value, the second target classifier 55 may determine that the corresponding tracks are generated by overhead structures.

Figure 5:
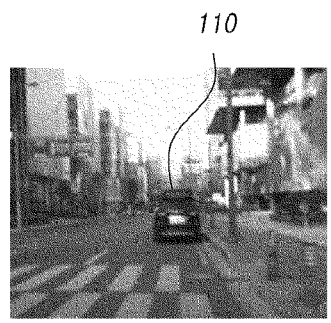
FIG. 5 illustrates an image of a preceding vehicle in front of a host vehicle.
Figure 6:
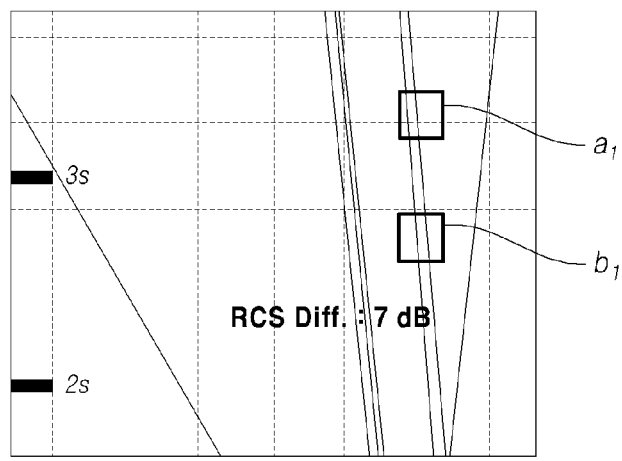
FIG. 6 illustrates tracks generated by the preceding vehicle of FIG. 5.
Figure 7:
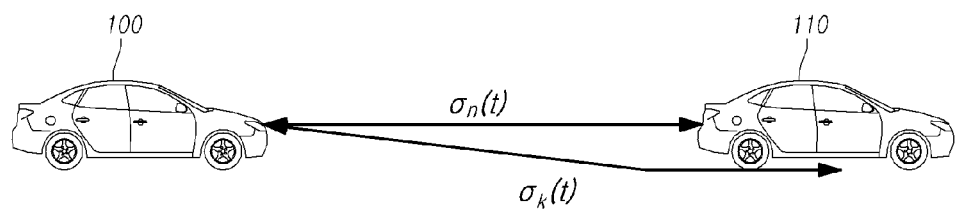
FIG. 7 is a mimetic diagram illustrating the relationship between the preceding vehicle and the host vehicle of FIG. 5.

As illustrated in FIG. 5, when there is a vehicle and a radar signal is reflected from the vehicle, the target detector 51 may form a reference track ($a_1$) and a neighbor track ($b_1$) spaced apart from each other as illustrated in FIG. 6. When the reference track ($a_1$) and the neighbor track ($b_1$) are generated by the vehicle, the reference track ($a_1$) may be generated by a radar signal reflected from a frame of the vehicle, but the neighbor track ($b_1$) may be generated by an open space, such as the road surface below the vehicle, as illustrated in FIG. 7. The neighbor track ($b_1$) is formed by the space below the vehicle rather than the actual vehicle, and may be referred to as a ghost track rather than an actual track. Accordingly, the radar signal reflected from the frame of the vehicle has relatively high signal intensity and the radar signal reflected from the bottom part of the vehicle has relatively low signal intensity. Accordingly, the RCS calculated from the reference track ($a_1$) and the RCS calculated from the neighbor track ($b_1$) have a predetermined difference or more.

Figure 8:
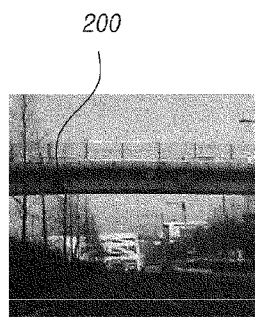
FIG. 8 illustrates an example of an overhead structure in front of the host vehicle.
Figure 9:
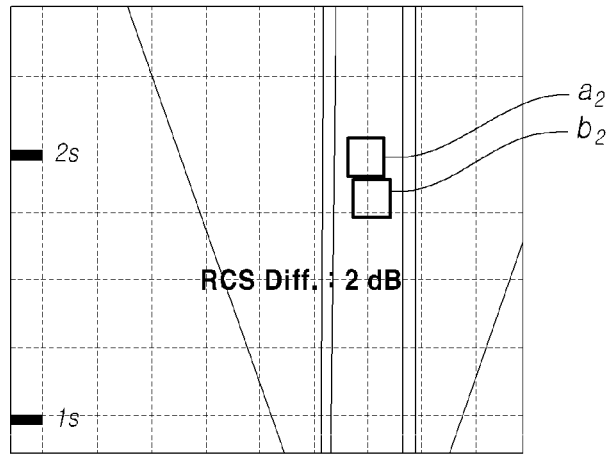
FIG. 9 illustrates tracks generated by the overhead structure of FIG. 8.
Figure 10:
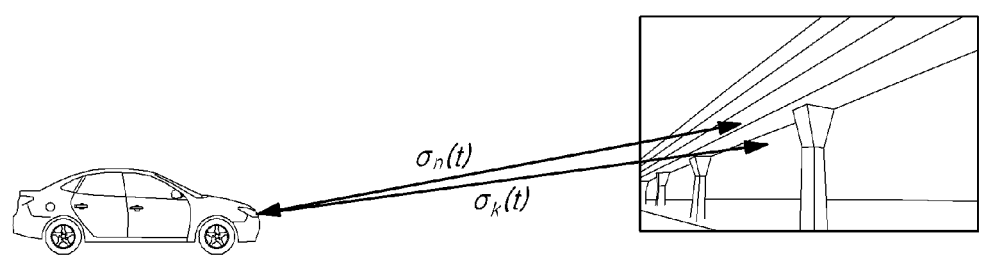
FIG. 10 is a mimetic diagram illustrating the relationship between the overhead structure and the host vehicle of FIG. 8.

Meanwhile, when the radar signal is reflected from a pedestrian overpass, which is the overhead structure, as illustrated in FIG. 8, the target detector 51 may form a reference track ($a_2$) and a neighbor track ($b_2$) as illustrated in FIG. 9. When the reference track ($a_2$) and the neighbor track ($b_2$) are formed by the overhead structure, both the reference track ($a_2$) and the neighbor track ($b_2$) may be generated by the radar signal reflected from the overhead structure 200, as illustrated in FIG. 10. Accordingly, the difference between signal intensities of the radar signals for forming the reference track ($a_2$) and the neighbor track ($b_2$) may be small. Therefore, the RCS calculated from the reference track ($a_2$) and the RCS calculated from the neighbor track ($b_2$) have a predetermined difference or less.

When the vehicle enters an indoor parking lot or a tunnel like a pedestrian overpass, a plurality of neighbor tracks ($b_2$) may be successively generated by the ceiling of the parking lot or the tunnel, and all of the reference track ($a_2$) and the neighbor tracks ($b_2$) may be generated from the ceiling of the parking lot or the tunnel, so that the RCS difference between the tracks is equal to or smaller than a predetermined value.

When the RCS difference is larger than or equal to a predetermined value on the basis of the RCS difference between the reference track (a) and the neighbor track (b), the second target classifier 55 may determine that the reference track (a) is generated by the vehicle and maintain the flag value as 1. When the RCS difference is smaller than the predetermined value, the second target classifier 55 may determine that the reference track (a) and the neighbor track (b) are generated by the overhead structure 200 and change the flag value to 0.

When only one track is calculated, the second target classifier 55 may determine whether the corresponding track is generated by the vehicle on the basis of the RCS of the track. That is, when the RCS of the corresponding track is larger than or equal to a preset predetermined threshold value, the second target classifier 55 may determine that the corresponding track is generated by the vehicle and maintain the flag value as 1. When the RCS of the corresponding track is smaller than the preset predetermined threshold value, the second target classifier 55 may determine that the corresponding track is generated by the overhead structure 200 and change the flag value to 0.

When it is determined that the reference track (a) is generated by the vehicle, the second target classifier 55 may operate the braking information unit 57 and generate information required for braking.

The braking information unit 57 may generate information on a location, a movement direction, and a speed of a preceding vehicle 110, which is a target, on the basis of the received radar signal. The braking information unit 57 may detect the location of the target on the basis of an intensity of the received radar signal and a difference between a transmission time and a reception time of the radar signal, and generate information on the movement direction and the speed of the preceding vehicle 110 through repeated transmission/reception of the radar signal.

The braking information unit 57 may determine whether to perform emergency braking on a host vehicle 100 through driving information of the host vehicle 100 collected by the driving information collection module 10 and generated braking information of the preceding vehicle 110. When it is determined that emergency braking is needed, the controller 50 may provide a warning to the driver and transfer a braking control signal to a brake.

Figure 1B:
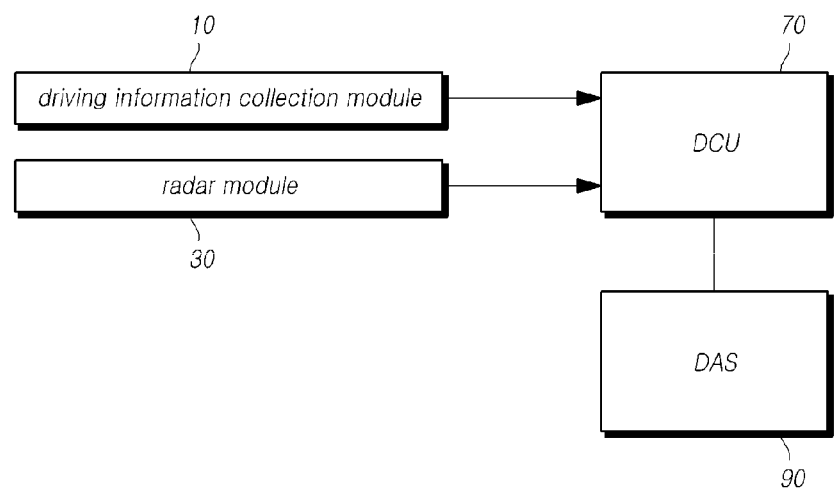
FIG. 1B is a block diagram illustrating an autonomous emergency braking system including a DCU according to the present disclosure.

FIG. 1B is a block diagram illustrating an autonomous emergency braking system including a DCU according to the present disclosure.

Referring to FIG. 1B, the autonomous emergency braking system according to the present embodiment may include a driving information collection module configured to acquire driving information of the vehicle, a radar module configured to radiate a radar signal to the outside of the vehicle and receive a radar signal reflected from a target, and a Domain Control Unit (DCU) 70 configured to process the driving information and the radar signal, determine whether to perform emergency braking on the vehicle, and control at least one driver assistance system module included in the vehicle.

According to an embodiment, a processor for processing a radar signal, a controller, and controllers of various devices included in the vehicle may be integrated into one device and implemented as a domain control unit. In this case, the domain control unit may generate various vehicle control signals and control a driver assistance system (DAS) 90 included in the vehicle and various devices of the vehicle related thereto.

The domain control unit 70 may form at least one track corresponding to the target on the basis of the processed radar signal, determine whether the track is generated by another vehicle, and determine whether the track determined to be generated by the other vehicle is generated by an overhead structure.

The domain control unit 70 may be included in the vehicle and may communicate with at least one image sensor mounted in the vehicle and a non-image sensor including a radar sensor. To this end, a proper data link or communication link, such as a vehicle network bus, for data transmission or signal communication may be further included.

The domain control unit 70 may operate to control one or more of various driver assistance systems (DAS) used by the vehicle. The domain control unit may control driver assistance systems (DAS) such as a Blind-Spot Detection (BSD) system, an Adaptive Cruise Control (ACC) system, a Lane Departure Warning System (LDWS), a Lane-Keeping Assist System (LKAS), and a Lane Change Assist System (LCAS) on the basis of sensing data captured by a plurality of non-image sensors and image data captured by the image sensor.

The domain control unit 70 may detect an interference signal from the received radar signal and reconstruct the radar signal on the basis of the detected interference signal. The domain control unit 70 may perform a process of pre-processing the received radar signal in order to more accurately detect the interference signal from the radar signal and use one of a signal differential method, a signal normalization method, a filtering method, a feature extraction method, and a noise reduction method in the pre-processing process.

The domain control unit 70 may detect the interference signal from the radar signal having passed through the pre-processing and reconstruct the radar signal on the basis of the detected interference signal. In order to reconstruct the radar signal, a mean filter and a filter using a Whittaker-Shannon interpolation formula may be used.

The domain control unit 70 may form at least one track generated by the target on the basis of the reconstructed radar signal. When the radar signal reflected from the target is detected, the domain control unit 70 may form the track for a location corresponding to the corresponding radar signal. The domain control unit 70 may form the track only for the radar signal having a preset predetermined magnitude or larger.

When a plurality of tracks is generated, the domain control unit 70 may identify whether there is a track neighboring each track within a preset predetermined range. Here, a track formed by the radar signal having a relatively high intensity is referred to as a reference track (a) and a track neighboring the reference track (a) is referred to as a neighbor track (b).

The domain control unit 70 may determine whether the reference track (a) and the neighbor track (b) are formed by the vehicle or by clutter other than the vehicle. The domain control unit 70 may classify the vehicle and the clutter through the existing various methods. The domain control unit 70 may classify tracks only into the vehicle and the clutter. The domain control unit 70 may set a flag value to 0 in the case of clutter and may set a flag value to 1 in the case of a vehicle.

The domain control unit 70 may determine whether the track determined as the vehicle is formed by the vehicle or by the overhead structure. The domain control unit 70 may distinguish between the vehicle and the overhead structure through a Radar Cross Section (RCS), which is a reflection area of the radar signal, and the size of the RCS may be calculated as the size of the received radar signal. The second target classifier 55 may calculate the size of the RCS for each track and calculate an RCS difference between the reference track (a) and the neighbor track (b).

When the difference between the reference track (a) and the neighbor track (b) is larger than or equal to a preset predetermined difference value, the domain control unit 70 may determine that the reference track (a) and the neighbor track (b) are generated by the vehicle. Meanwhile, when the difference between the reference track (a) and the neighbor track (b) is equal to or smaller than a preset difference value, the domain control unit 70 may determine that the corresponding tracks are generated by the overhead structure.

When the RCS difference is larger than or equal to a predetermined value on the basis of the RCS difference between the reference track (a) and the neighbor track (b), the domain control unit 70 may determine that the reference track (a) is generated by the vehicle and maintain the flag value at 1. When the RCS difference is smaller than the predetermined value, the domain control unit 70 may determine that the reference track (a) and the neighbor track (b) are generated by the overhead structure 200 and change the flag value to 0.

When only one track is calculated, the domain control unit 70 may determine whether the corresponding track is generated by the vehicle on the basis of the RCS of the track. That is, when the RCS of the corresponding track is larger than or equal to a preset predetermined threshold value, the domain control unit 70 may determine that the corresponding track is generated by the vehicle and maintain the flag value as 1. When the RCS of the corresponding track is smaller than the preset predetermined threshold value, the domain control unit 70 may determine that the corresponding track is generated by the overhead structure 200 and change the flag value to 0.

When it is determined that the reference track (a) is generated by the vehicle, the domain control unit 70 may generate information required for braking.

The domain control unit 70 may generate information on a location, a movement direction, and a speed of the preceding vehicle 110, which is the target, on the basis of the received radar signal. The domain control unit 70 may detect the location of the target through the intensity of the received radar signal and a difference between a transmission time and a reception time of the radar signal, and generate information on the movement direction and the speed of the preceding vehicle 110 through repeated transmission/reception of the radar signal.

The domain control unit 70 may determine whether to perform emergency braking on the host vehicle 100 on the basis of driving information of the host vehicle collected by the driving information collection module 10 and generated braking information of the preceding vehicle 110. When it is determined that emergency braking is needed, the domain control unit 70 may provide a warning to the driver and transfer a braking control signal to a brake.

Figure 11:
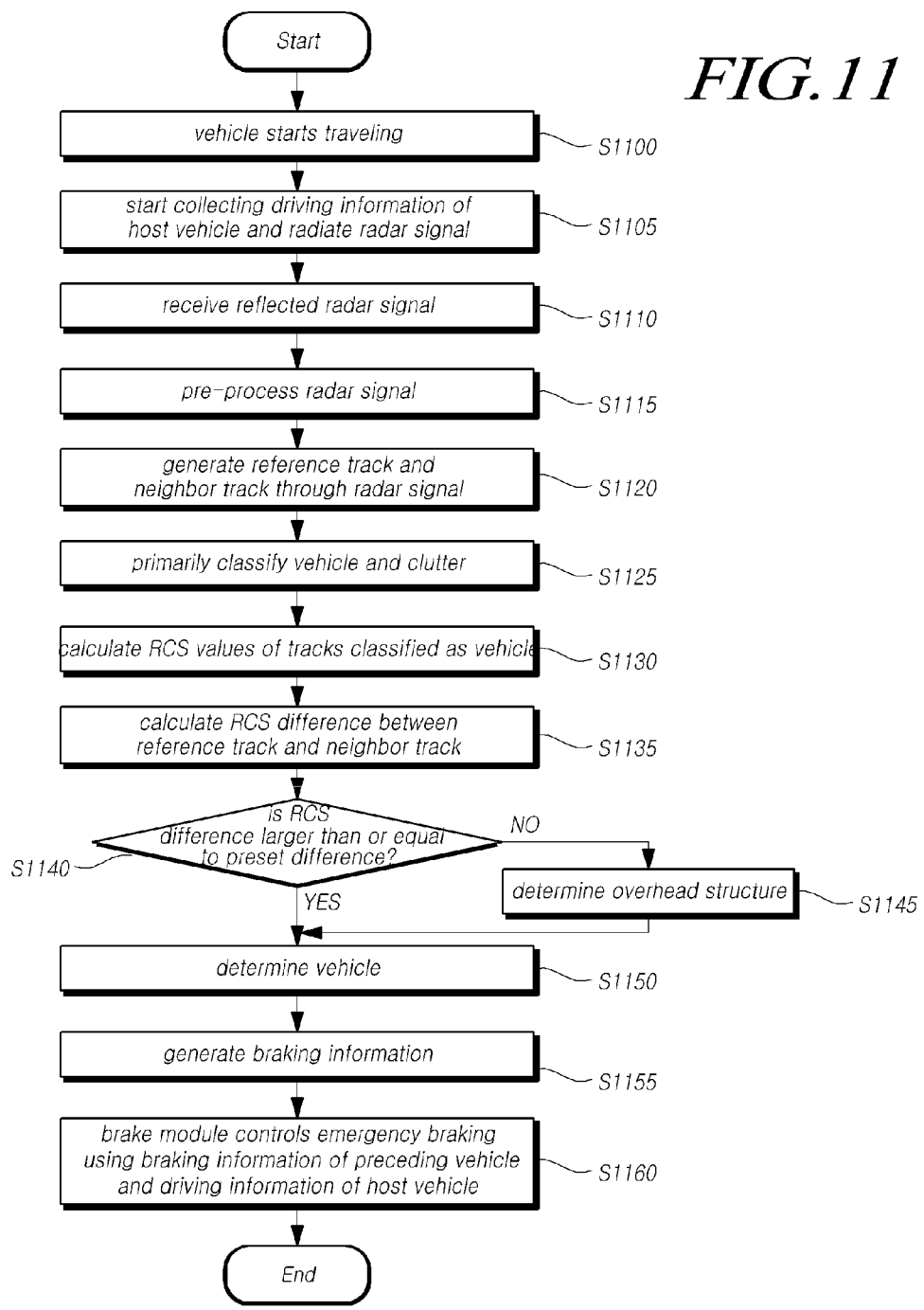
FIG. 11 is a flowchart illustrating a process in which the autonomous emergency braking system detects a vehicle and performs emergency braking according to the present disclosure.

A process in which the autonomous emergency braking system detects the target and performs emergency braking through such a configuration will be described with reference to FIG. 11. The following description is made based on the controller 50, but is not limited thereto. In the following description of the operation of the controller 50, the operation may be substantially equally performed to that of the domain control unit 70 except for content that is not applicable to the controller 50.

When the vehicle starts traveling in S1100, the driving information collection module 10 may collect driving information of the host vehicle 100 through various sensors and the radar module 30 may radiate a radar signal in S1105 and receive a radar signal reflected from a target in S1110. The radar module 30 may process the received radar signal and transfer the radar signal to the controller 50 in S1115.

The controller 50 may generate a reference track (a) and a neighbor track (b) on the basis of the radar signal in S1120. The controller 50 may determine whether the track is generated by the vehicle or the clutter through information on the generated reference track (a) and neighbor track (b) in S1125. When it is determined that the track is generated by the vehicle, the controller 50 may set a flag value of track to 1.

The controller 50 may calculate RCSs of the reference track (a) and the neighbor track (b) in S1130 and calculate an RCS difference between the reference track (a) and the neighbor track (b) in S1135. When the RCS difference is larger than or equal to a preset value in S1140-Y, the controller 50 determines that the reference track (a) is generated by the vehicle in S1150 and maintains the flag value at 1. On the other hand, when the RCS difference between the reference track (a) and the neighbor track (b) is equal to or smaller than the preset value in S1140-N, the controller 50 determines that the reference track (a) and the neighbor track (b) are generated by the overhead structure 200 in 51145 and changes the flag value to 0.

Meanwhile, when only the reference track (a) is detected, the controller 50 determines that the reference track (a) is generated by the vehicle and maintains the flag value at 1 if the RCS value of the reference track (a) is larger than or equal to a predetermined threshold value.

When the flag value is maintained at 1, the controller 50 may generate braking information of the preceding vehicle 110 required for emergency braking in S1155. The controller 50 may determine whether to perform emergency braking on the basis of driving information of the host vehicle 100 provided by the driving information collection module 10 and braking information in S1160. When it is determined that the emergency braking is needed, the controller 50 may transfer a braking control signal to a brake.

As described above, when it is primarily determined that the track is a vehicle, the autonomous emergency braking system according to the present disclosure may determine whether the overhead structure 200 is mistaken for a vehicle on the basis of the RCS difference. Accordingly, since a vehicle can be accurately determined, it is possible to prevent the emergency braking from being performed due to the overhead structure 200. That is, the reliability of the system can be improved by preventing a malfunction of the autonomous emergency braking system.

Meanwhile, although it has been described that the vehicle is detected only through the radar without another detection means in the above embodiments, if the present disclosure is applied to the case in which another detection means such as a camera is mounted and information detected by the other detection means is verified, the vehicle can be more accurately detected.

The standard details or standard documents mentioned in the above embodiments are omitted for the simplicity of the description of the specification, and constitute a part of the present specification. Therefore, when a part of the contents of the standard details and the standard documents is added to the present specifications or is disclosed in the claims, it should be construed as falling within the scope of the present disclosure.

Although the embodiments of the present disclosure have been described for illustrative purposes, those skilled in the art will appreciate that various modifications, additions and substitutions are possible, without departing from the scope and spirit of the disclosure. Therefore, exemplary aspects of the present disclosure have not been described for limiting purposes. The scope of the present disclosure shall be construed on the basis of the accompanying claims in such a manner that all of the technical ideas included within the scope equivalent to the claims belong to the present disclosure.

What is claimed is:
1. An autonomous emergency braking system comprising:
    a driving information collection module configured to acquire driving information of a vehicle and process the acquired driving information;

a radar module configured to radiate a radar signal to an outside of the vehicle, receive the radar signal reflected from a target, and process the received radar signal; and a controller configured to determine whether to perform emergency braking on the vehicle, based at least partially on processing of the driving information and the radar signal, wherein the controller forms a reference track corresponding to the target through the processed radar signal and a neighbor track corresponding to a space below the target, and determines, based on a comparison between a Radar Cross Section (RCS) difference between the reference track and the neighbor track and a preset difference value, whether the reference track is generated by an overhead structure or another vehicle.

2. The autonomous emergency braking system of claim 1, wherein the radar module comprises:
a radar signal transmitter configured to radiate the radar signal;
a radar signal receiver configured to receive the radar signal reflected from the target; and
a signal processor configured to process the received radar signal,
wherein the controller comprises:
a target detector configured to form at least one track corresponding to the target through the processed radar signal;
a first target classifier configured to determine whether the at least one track is generated by the other vehicle; and
a second target classifier configured to receive information on the reference track and the neighbor track from the first target classifier and determine whether the reference track is generated by the overhead structure or the other vehicle.

3. The autonomous emergency braking system of claim 2, wherein the controller divides tracks into the reference track having a relatively high intensity and the neighbor track neighboring the reference track within a predetermined range.

4. The autonomous emergency braking system of claim 1, wherein the controller calculates an RCS for each of the reference track formed by a radar signal having a relatively high intensity and the neighbor track neighboring the reference track and calculates the RCS difference between the reference track and the neighbor track.

5. The autonomous emergency braking system of claim 1, wherein the controller determines that the reference track is generated by the other vehicle when the RCS difference is larger than or equal to the preset difference value and determines that the reference track is generated by the overhead structure when the RCS difference is smaller than the preset difference value.

6. The autonomous emergency braking system of claim 1, wherein, when only one track is formed by the target detector, the controller calculates an RCS of the track, and when the RCS is larger than or equal to a preset threshold value, determines that the track is generated by the other vehicle.

7. The autonomous emergency braking system of claim 2, wherein the first target classifier determines the target generating the track as one of a vehicle, an undecided type, and clutter.

8. An autonomous emergency braking system comprising:
a driving information collection module configured to acquire driving information of a vehicle;
a radar module configured to radiate a radar signal to an outside of the vehicle and receive the radar signal reflected from a target; and
a domain control unit configured to process the driving information and the radar signal, determine whether to perform emergency braking on the vehicle, and control at least one driver assistance system module included in the vehicle,
wherein the domain control unit forms a reference track corresponding to the target through the processed radar signal and a neighbor track corresponding to a space below the target, and determines, based on a comparison between a Radar Cross Section (RCS) difference between the reference track and the neighbor track and a preset difference value, whether the reference track is generated by an overhead structure or another vehicle.

9. The autonomous emergency braking system of claim 8, wherein the domain control unit divides tracks into the reference track formed by a radar signal having a relatively high intensity and the neighbor track neighboring the reference track within a predetermined range.

10. The autonomous emergency braking system of claim 8, wherein the domain control unit calculates an RCS for each of the reference track formed by a radar signal having a relatively high intensity and the neighbor track neighboring the reference track and calculates the RCS difference between the reference track and the neighbor track.

11. The autonomous emergency braking system of claim 10, wherein the domain control unit determines that the reference track is generated by the other vehicle when the RCS difference is larger than or equal to the preset difference value and determines that the reference track is generated by the overhead structure when the RCS difference is smaller than the preset difference value.

12. The autonomous emergency braking system of claim 8, wherein, when only one track is formed, the domain control unit calculates an RCS of the track, and when the RCS is larger than or equal to a preset threshold value, determines that the track is generated by the other vehicle.

13. The autonomous emergency braking system of claim 8, wherein the domain control unit determines the target generating the tracks as one of a vehicle, an undecided type, and clutter.

14. A method of controlling an autonomous emergency braking system, the method comprising:
radiating a radar signal;
receiving the radar signal reflected from a target;
forming a reference track corresponding to the target based on the radar signal and a neighbor track corresponding to a space below the target; and
determining, based on a comparison between a Radar Cross Section (RCS) difference between the reference track and the neighbor track and a preset difference value, whether the reference track is generated by an overhead structure or another vehicle.

* * * * *